United States Patent [19]
Nagashima

[11] Patent Number: 6,125,547
[45] Date of Patent: Oct. 3, 2000

[54] HAND-LEVER DEVICE FOR TRIMMER

[75] Inventor: Akira Nagashima, Kawasaki, Japan

[73] Assignee: Kioritz Corporation, Tokyo, Japan

[21] Appl. No.: 09/188,304

[22] Filed: Nov. 10, 1998

[30] Foreign Application Priority Data

Nov. 13, 1997 [JP] Japan .................................. 9-311767

[51] Int. Cl.$^7$ .................................................. A01G 3/06
[52] U.S. Cl. .............................. 30/276; 56/12.1; 477/199
[58] Field of Search ................... 30/276, 382; 74/501.6, 74/526; 123/398; 477/199, 200; 56/12.1, 12.7, 11.3, 16.7, 17.5

[56] References Cited

U.S. PATENT DOCUMENTS

| | | | |
|---|---|---|---|
| 3,026,665 | 3/1962 | Hoff | 56/11.3 |
| 4,006,528 | 2/1977 | Katsuya | 30/276 |
| 4,335,566 | 6/1982 | Hurd | 56/11.8 |
| 4,428,180 | 1/1984 | Carlson | 56/11.3 |
| 5,664,543 | 9/1997 | Taomo et al. | 123/400 |
| 5,685,271 | 11/1997 | Taomo et al. | 123/398 |
| 5,718,052 | 2/1998 | Taomo et al. | 30/276 |
| 5,758,546 | 6/1998 | Taomo et al. | 74/501.6 |
| 5,865,155 | 2/1999 | Nagashima | 123/398 |
| 5,934,149 | 8/1999 | Tuda | 30/382 |

FOREIGN PATENT DOCUMENTS

| | | |
|---|---|---|
| 57-17352 | 6/1955 | Japan . |
| 52-81227 | 7/1977 | Japan . |
| 53-43523 | 10/1978 | Japan . |
| 57-19944 | 4/1982 | Japan . |
| 10-35318 | 2/1998 | Japan . |

*Primary Examiner*—M. Rachuba
*Assistant Examiner*—Dominic Troiano
*Attorney, Agent, or Firm*—Jacobson, Price, Holman & Stern, PLLC

[57] ABSTRACT

A hand-lever device for a trimmer has a rotatably-operated main lever for operating a cable which is coupled to a driven member. A pulling stroke amplifying mechanism for amplifying the stroke of the cable pulled by the main lever is provided between the main lever and the cable. The pulling stroke amplifying mechanism is provided with a wire attaching portion to which a wire for pulling and releasing a cutter braking device is attached.

23 Claims, 12 Drawing Sheets

HAND-LEVER DEVICE FOR TRIMMER

BACKGROUND OF THE INVENTION

The present invention relates to a hand-lever device for a trimmer provided to operate a driven member such as a throttle valve of an internal combustion engine via a cable and, in particular, to a hand-lever device provided in the vicinity of a grip portion of a handle of a trimmer such as a hedge trimmer and a grass trimmer and which is suitable for operating the throttle valve to be opened and closed through a throttle cable.

DESCRIPTION OF THE PRIOR ART

In a trimmer such as a hedge trimmer, a grass trimmer, or the like, which has a working section, such as a cutter, driven by an internal combustion engine, a hand-lever device is arranged in the vicinity of a grip portion of a U-shaped handle or a bar handle provided thereto, for adjusting the throttle valve opening of the internal combustion engine while holding the handles.

This hand-lever device is usually provided with a throttle trigger (a throttle lever) which is hand operated by an operator and the throttle opening is adjusted through a throttle cable by manipulating a rotatable throttle lever. In general, the throttle valve is constantly biased in a direction toward the minimum throttle opening position (the idle revolution throttle opening position). The throttle valve is normally held at the idle revolution throttle opening position and opens from the idle revolution throttle opening position toward a high revolution throttle opening position when the throttle cable is pulled more than a predetermined distance to eliminate play in the cable.

As an example of the hand-lever device for adjusting the throttle valve opening as described above, an automatic restoring type has been known in which the lever is automatically returned to the original idling position (the idle revolution throttle opening position) together with the throttle valve when the throttle lever is released from an operational position. A fixed type thereof is also known in which the throttle lever is held unmoved at a desired operational position even when the operator releases the lever (refer to Japanese Utility Model Public Disclosure Sho 57-19944).

In the automatic restoring type hand-lever device provided to a trimmer, an internal combustion engine automatically restores to its idling position when the operator releases the throttle lever. If the trimmer is of a type whose rotational driving force of the engine is transmitted via a centrifugal clutch to the working section such as a cutter, the working section can be stopped by disengaging the centrifugal clutch to shut the power to the working section. Therefore, in the case of an emergency, the power to the working section can be shut off by immediately returning the throttle valve to the idle revolution opening position. Therefore, the automatic restoring type hand-lever device has an advantage of higher safety. On the contrary, the throttle lever must be always held at a desired operational position by hand which causes a difficulty in keeping it at an intermediate throttle opening position, fatigue in hand, inconstant manipulation in terms of the revolution speed, or the like.

From the handling point of view, in general, a rotationally operated lever like a throttle lever operated by hand, is preferably held at only two positions, i.e., a release position and a set position (a lever-held position) without taking the intermediate position. It is considered to bring an excellent operability if the throttle valve is constructed to take the set positions for both of a throttle partially opened position and a fully opened position (WOT).

On the other hand, the fixed type can solve the problems of the automatic restoring type and enables to hold the throttle lever unmoved at any desired operational position even when the lever is released. Therefore, the hands can be free and it facilitates an easy cutting operation. However, in the case of emergency, it requires to release the throttle lever held at a predetermined position and it can not be stopped immediately. In the respect of safety, it is inferior than the automatic restoring type.

Further, in either of above-stated types, in order to return the throttle valve to the previous throttle opening position after releasing the throttle lever to interrupt the operation, the throttle lever must be readjusted to move it to the previous operational position. Such an adjusting operation is troublesome.

To solve the above-stated problems of the conventional hand lever devices, the assignee of the present invention formerly proposed a hand-lever device as disclosed, for example, in U.S. Pat. No. 5,718,052. Such hand lever device comprises a rotatably operated main lever and a sub-lever wherein a cable coupled to a driven member is pulled by the sub-lever via a direction changing member such as a movable pulley which is moved by the main lever.

The proposed hand-lever device attains many advantages, namely, it allows to adjust the opening of a throttle valve or a driven member through a cable, to easily hold the throttle at a desired throttle opening position and to immediately return to the minimum throttle opening position (the idle revolution throttle opening position), whereby high safety is assured and reduces fatigue in the hand and fingers. Further, readjustment is not required to set the throttle valve to the former throttle opening position, i.e., the position before the throttle valve is returning to the idle revolution throttle opening position.

However, the hand-lever device proposed and described above has a disadvantage, that is, the stroke of the pulled cable corresponds to the rotated angle of the main lever. Therefore, a rotational angle of the main lever must be relatively large to pull the cable a predetermined distance. This means that a relatively large space between the grip portion of the handle and the main lever is required to allow the lever to rotate through a predetermined angle and it causes to increase the size of the machine and the weight thereof. Further, a large space occupied by the main lever which protrudes outwardly from the handle is often obstructive regardless of being used or not and gives an adverse effect on the working conditions and operability of the machine.

Therefore, the object of the present invention is to provide a hand-lever device for a trimmer which facilitates (a) to adjust the opening of the throttle valve or the driven member via the cable, (b) to hold at a desired opening position, (c) to immediately return to the minimum opening position (the idle revolution throttle opening position) to assure high safety and reduces fatigue of the hand and fingers, (d) to eliminate a readjustment operation when it is desired to set the throttle valve to the previous throttle opening position, i.e., the position before the throttle valve is returned to the idle revolution throttle opening position, (e) and still allows to reduce the weight and size of the device, and (f) to improve the working conditions and operability, and (g) further to allow to operate a cutter braking device and a throttle lever by a single lever.

SUMMARY OF THE INVENTION

The objects described above can be achieved by a hand-lever device for a trimmer, comprising: a) a driven member; b) a cable coupled to the driven member; c) a rotatably-operated main lever for manipulating the cable; d) an operation stroke amplifying mechanism provided between the main lever and the cable and for increasing stroke of the cable which is pulled by the main lever; e) a cutter braking device; f) a wire for controlling the cutter braking device; and g) the operation stroke amplifying mechanism having a wire attaching portion for attaching the wire.

In addition to the constitution described above, a more preferred embodiment of the hand-lever device is provided with a position adjusting mechanism for operating the cable coupled to the driven member via a direction changing member and for moving the direction changing member and holding it at an arbitrary position.

As the operation stroke amplifying mechanism, a lever or a gear set may be employed.

In another preferred position adjusting mechanism, a rotatably-operated sub-lever is provided and the direction changing member is attached apart from a rotational axis of the sub-lever. In this case, the sub-lever is preferably allowed to be held unmoved at an arbitrary operational position.

A hand-lever device for a trimmer according to the present invention may typically be used, but not limited, for adjusting the throttle valve opening of the throttle valve of an internal combustion engine and controlling the cutter braking device of a trimmer, and a more preferable embodiment for such use may be constituted as follows.

In the hand-lever device for a trimmer, that is to say, wherein the throttle valve is normally biased toward the idle revolution throttle opening position, the play of the throttle cable connected thereto is eliminated when it pulled from the non-operated condition through a distance exceeding a predetermined value, the throttle valve moves from the idle revolution throttle opening position. The hand-lever device is arranged in the vicinity of the grip portion of the handle of a trimmer to control a working section having a cutter or the like which is driven by an internal combustion engine with the throttle valve described above. In the hand-lever device, the play is eliminated by pulling the throttle lever cable by the main lever via the operation stroke amplifying mechanism and the direction changing member. The throttle valve opening is adjusted by the direction changing member which is forced to move by the position adjusting mechanism in the direction to pull the throttle cable. This constitution makes it possible to pull the wire connected to the wire attaching portion provided to the operation stroke amplifying mechanism. The wire is installed in the vicinity of the cutter of the trimmer and is coupled to the cutter braking device which is pressed against the cutter. The cutter braking device is released interlocking with the operation of opening the throttle valve.

A preferred embodiment of a hand-lever device constituted as above according to the present invention for a trimmer, eliminates the play, when the main lever is rotated to a set position adjacent to the grip portion of the handle as the throttle cable is pulled through the predetermined distance via the operation stroke amplifying mechanism employing the lever, or the like. The direction changing member includes the pulley, or the like.

Since the stroke (the operational length) of the cable pulled by the main lever is amplified by the operation stroke amplifying mechanism, the rotated-operational angle required for the main lever to pull the cable through a required distance is smaller than the conventional one with no amplification. This makes it possible to reduce the space occupied between the grip portion of the handle and the main lever for rotating the lever. As a result, the device can be smaller and lighter and also improves working condition and operability.

When an operational portion such as a sub-lever or the like provided to the position adjusting mechanism is operated to a desired position while the main lever is held at the set position, the direction changing member is forced to move in the direction to pull the throttle cable and whereby the throttle cable is further pulled by the operation stroke amplifying mechanism and the direction changing member and the throttle valve opening is adjusted to move from the minimum throttle opening position (the idle throttle opening position) to a larger opening position.

In this case, the stroke of the pulled throttle cable is twice as long as that of the direction changing member because the cable is pulled by the direction changing member while being wound around the direction changing member (the stroke amplified by a moving pulley). Therefore, the operation stroke required for the position adjusting mechanism to adjust the throttle valve opening, i.e., the stroke of the direction changing member can be reduced. As a result, a smaller and lighter device is accomplished.

In this condition, the operational portion such as the sub-lever or the like is held unmoved at the operational position even if it released, due to a position holding means installed thereto. The throttle valve is held at the adjusted opening (the set opening) and the wire coupled to the cutter braking device is also held under tension and the cutter braking device remains released. This reduces the loading to the hand and fingers.

In the case of an emergency while the throttle valve opening is adjusted as above, the main lever is released to immediately and suddenly lower the engine revolution speed, the main lever is released. Since the throttle cable is normally biased in the direction to close the throttle valve, the main lever and the operation stroke magnifying mechanism are pulled in a counter-direction so as to return to their original positions, whereby the throttle cable is brought back to the non-operating condition and allows the throttle valve to return to the idle revolution throttle opening position. This results in the internal combustion engine running at idle. When the main lever is released, the brake control wire automatically returns to its original position because the wire is biased against the cutter, and the rotation of the cutter is braked by the cutter braking device.

In case of a trimmer in which the rotational power is transmitted from the internal combustion engine through a centrifugal clutch to the working section such as a cutter, releasing the main lever leads to the shut-off of the centrifugal clutch and further to the discontinuity of the power transmission to the working section, i.e., the automatic stop of the working section such as a cutter, and the cutter braking device, which provides higher safety.

As described above, when the main lever is released and then is again rotated to the set position near the grip portion, the play of the throttle cable is eliminated and the operational portion such as a sub-lever provided to the position adjusting mechanism is still held at its former operational position. Therefore, the throttle valve is brought back to the former throttle opening position, i.e., the position before releasing the main lever, and this makes it unnecessary to readjust the sub-lever.

As described above, the hand-lever device according to the present invention for a trimmer, allows the throttle opening of a throttle valve or the like, or a driven member to be adjusted, to be easily held at a desired throttle opening position, and to be immediately returned to its minimum opening position (the idle revolution throttle opening position), and secures high safety, reduces fatigue in the hand and fingers. Further, it makes the readjustment unnecessary when the throttle valve is desired to be set to the former throttle opening position, i.e., the position before the throttle valve is returned to the idle throttle opening position, and provides a smaller and lighter device and improvement in working condition and operability of the device. Moreover, the activation of the opening and closing of the throttle lever and the activation of the cutter braking device by a single lever operation can be implemented in conjunction with each other by an operation of a single lever.

DETAILED DESCRIPTION OF THE PREFERRED EMBODIMENTS

Referring to the attached drawings, embodiments of the present invention will be described in detail.

Figure 1:
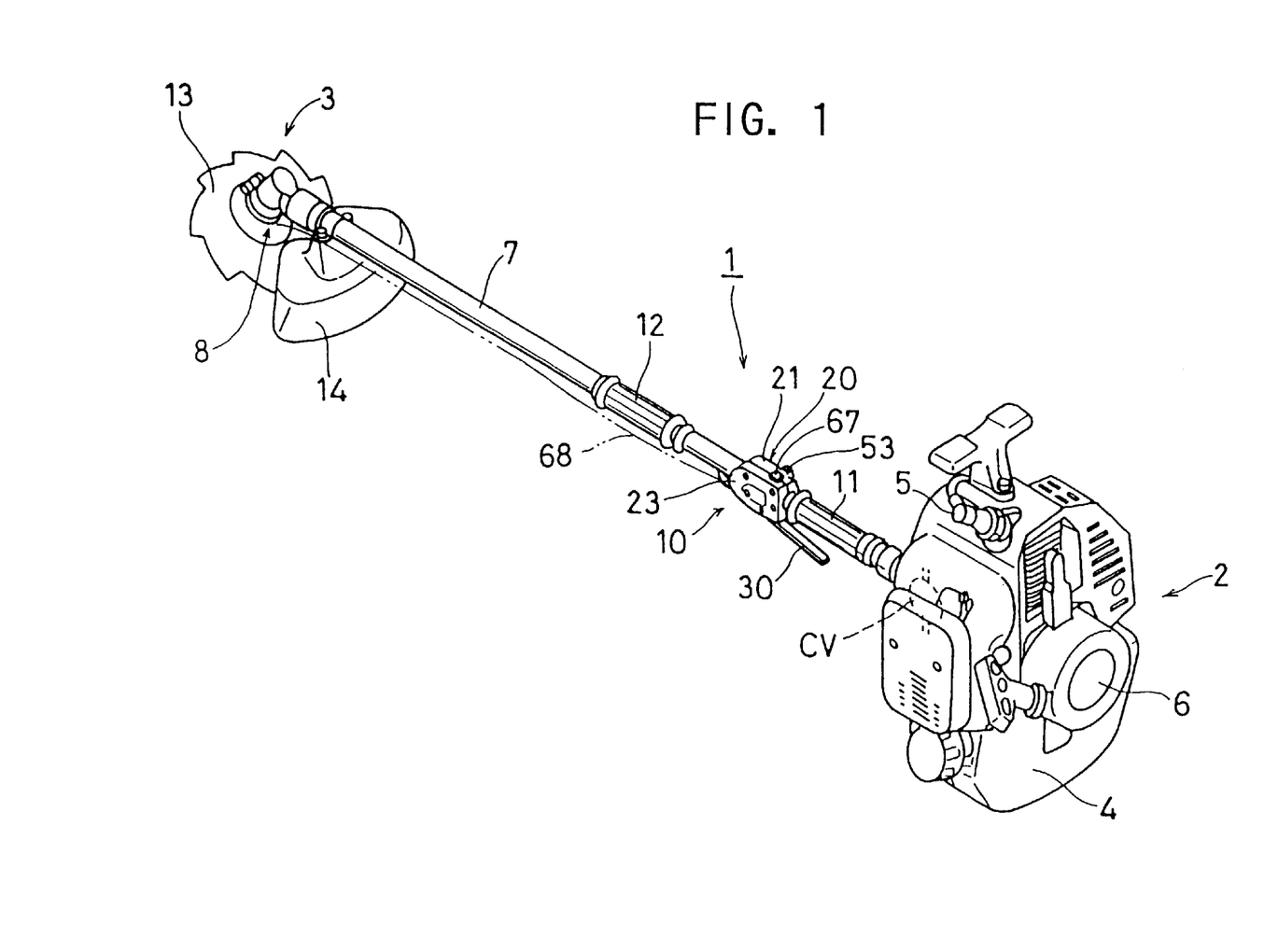
FIG. 1 is a perspective view of a grass trimmer employing an embodiment of a hand-lever device for a trimmer according to the present invention.

FIG. 1 shows an example of a grass trimmer employing an embodiment of a hand-lever device for a trimmer according to the present invention. The illustrated portable grass trimmer 1 is provided with a working section 3 at the front end of a bar handle 7 (an operation rod) including grip portions 11, 12 spaced at a predetermined distance in an axial direction, a cutter 13, a cutter braking device 8, a safety cover 14, or the like, and a power source to drive the cutter 13 through a drive shaft (not illustrated) inserted into the bar handle 7 such as an internal combustion engine 2 (a two-stroke cycle air-cooled type compact gasoline engine) at the rear end of the bar handle 7. The internal combustion engine 2 is provided with a recoil starter 6 and a fuel tank 4. The internal combustion engine 2 is installed with an ignition plug 5 and a carburetor (not illustrated) having a throttle valve CV. The structure of the cutter braking device 8 may be similar to that of the known devices described in Japanese Patent Laid-open Publication No. Sho 52-81227, Japanese Utility Model Public Disclosure Sho 53-42523, Japanese Utility Model Laid-open Disclosure Sho 57-17352, or the like and the contents of which are incorporated by reference and the detailed description thereof shall be omitted.

In the present embodiment, the throttle valve CV is normally biased in the direction toward the minimum throttle opening position (the idle throttle opening position). When a throttle (inner) cable 17 (FIG. 5) described hereinbelow connected to the throttle valve CV is pulled more than a predetermined distance from a non-operational position and the play is eliminated, the throttle valve CV begins to open from the minimum throttle opening position.

To adjust the throttle opening of the throttle valve CV, a hand-lever device 10 for a trimmer in accordance with the present embodiment is provided in the vicinity of one of grip portions 11, 12, i.e., the rear grip portion 11 which is usually held by right hand of an operator.

Figure 2:
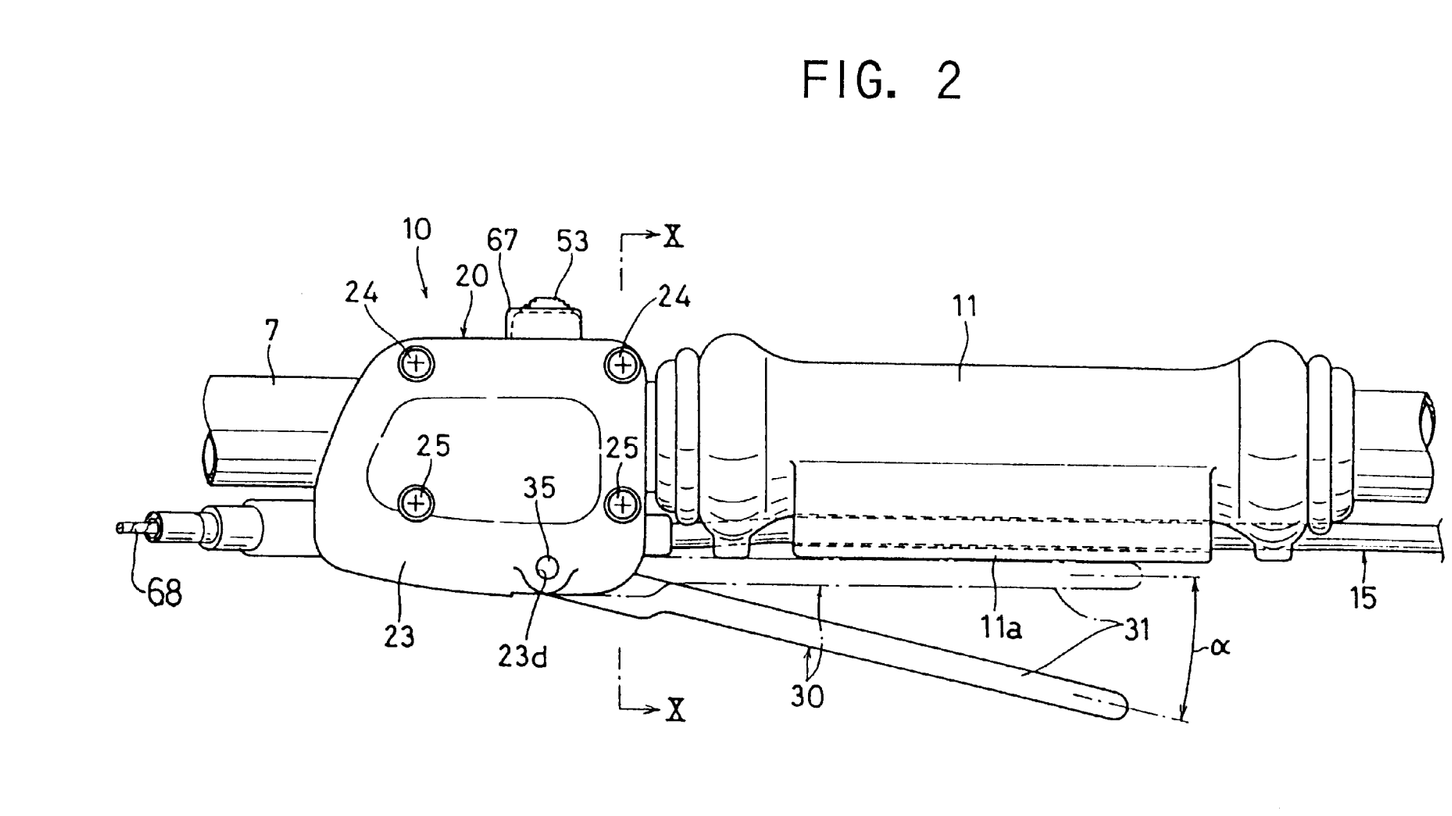
FIG. 2 is a left side view of an embodiment of a hand-lever device for a trimmer according to the present invention.
Figure 3:
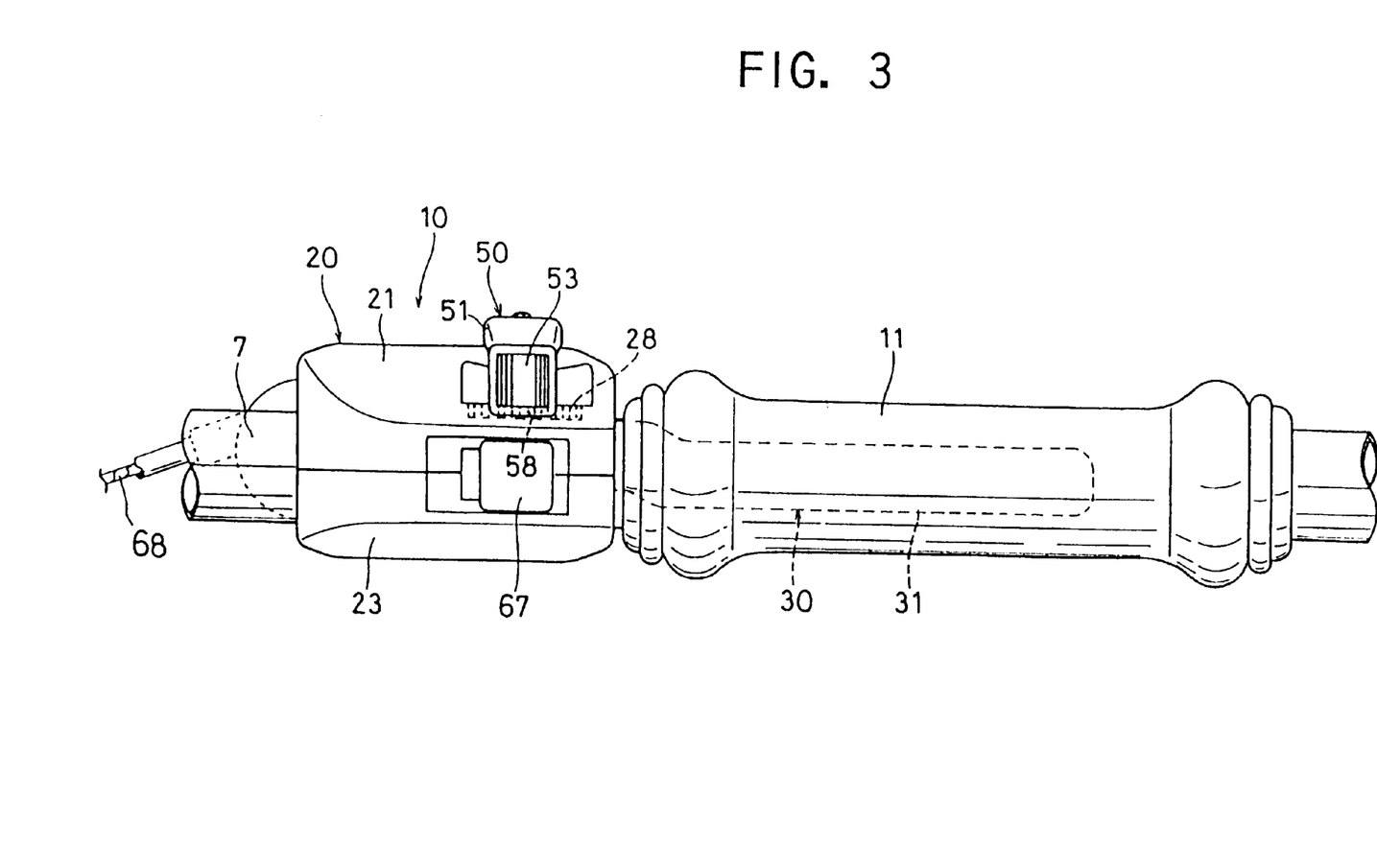
FIG. 3 is a plan of an embodiment of a hand-lever device for a trimmer according to the present invention.
Figure 4:
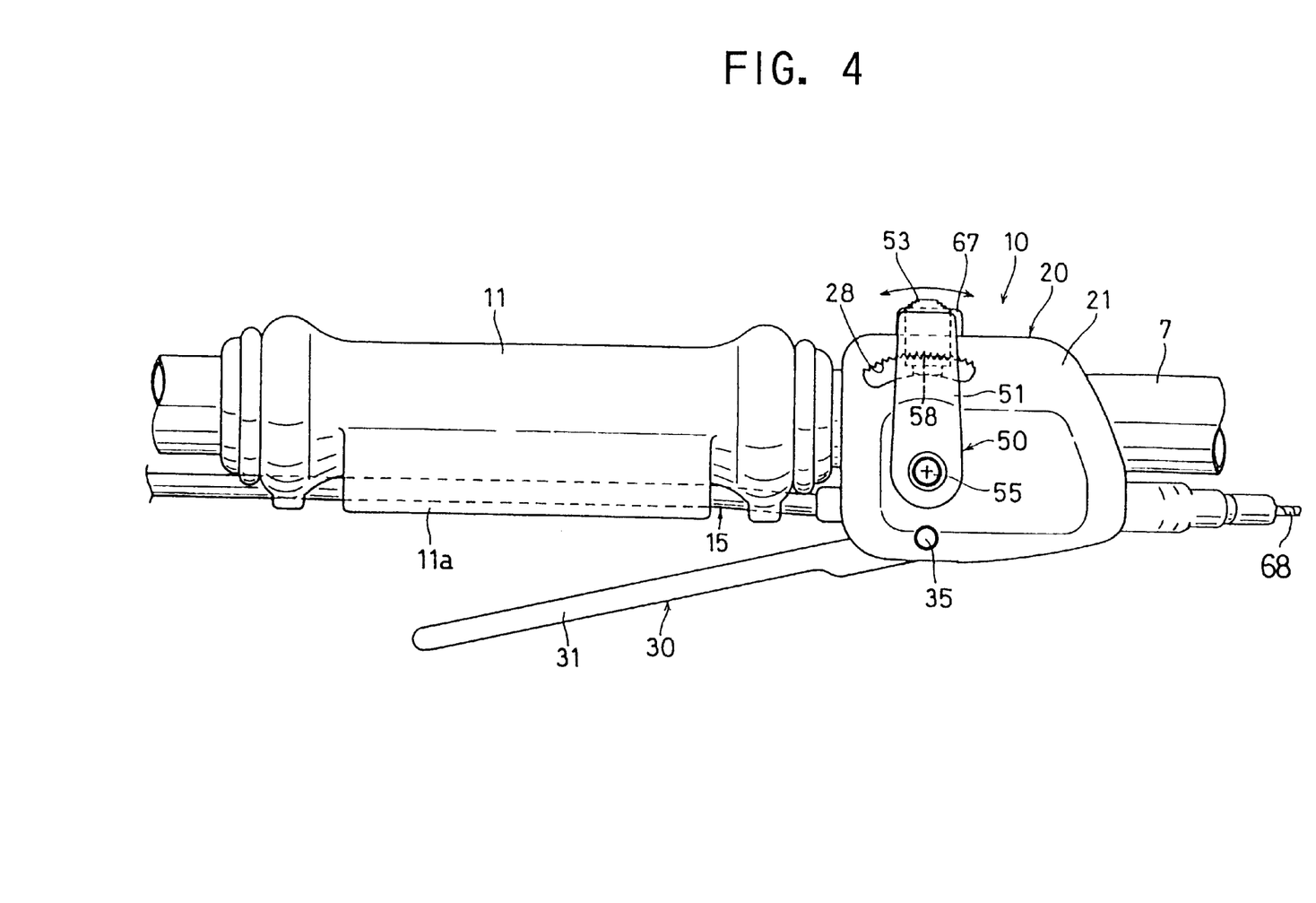
FIG. 4 is a right side view of an embodiment of a hand-lever device for a trimmer according to the present invention.

The hand-lever device 10, as its external shape is illustrated in FIGS. 2 through 4, has a case member 20 which is fitted to the handle 7 in the vicinity of the rear grip portion 11 thereof. The case member 20 has a throttle cable 17 inserted into an outer tube 16 of a Bowden cable 15 (FIG. 5) coupled to the throttle valve CV and a main lever 30 rotatably held to pull a wire 68 for releasing the cutter braking device 8 which extends forwardly along the bar handle 7. The cutter braking device 8 has a friction member (not illustrated) normally biased against the upper surface of the cutter 13, and the wire 68 is installed substantially without play between the friction member and the main lever 30.

Figure 6:
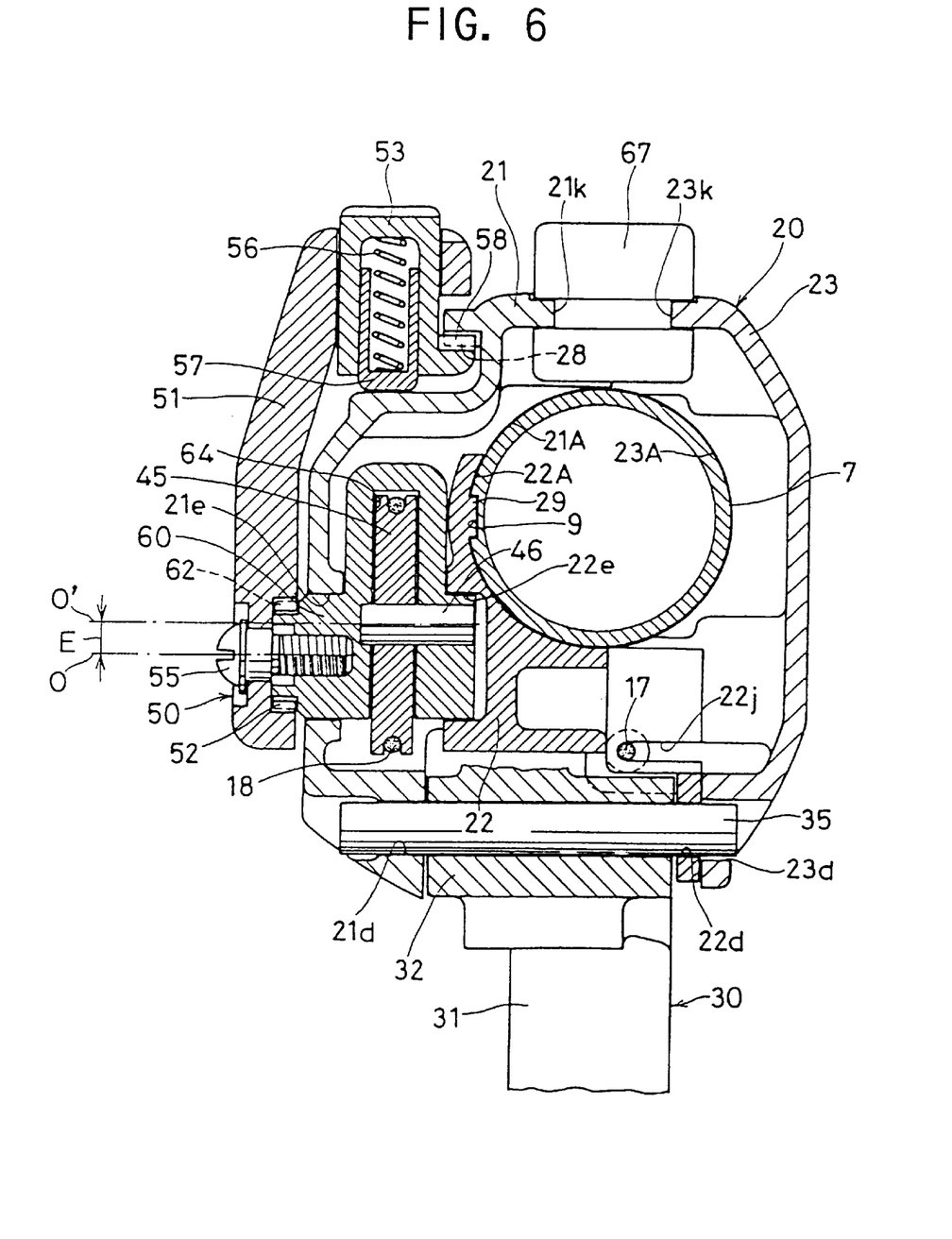
FIG. 6 is a sectional view taken on line VI—VI of FIG. 5.
Figure 7:
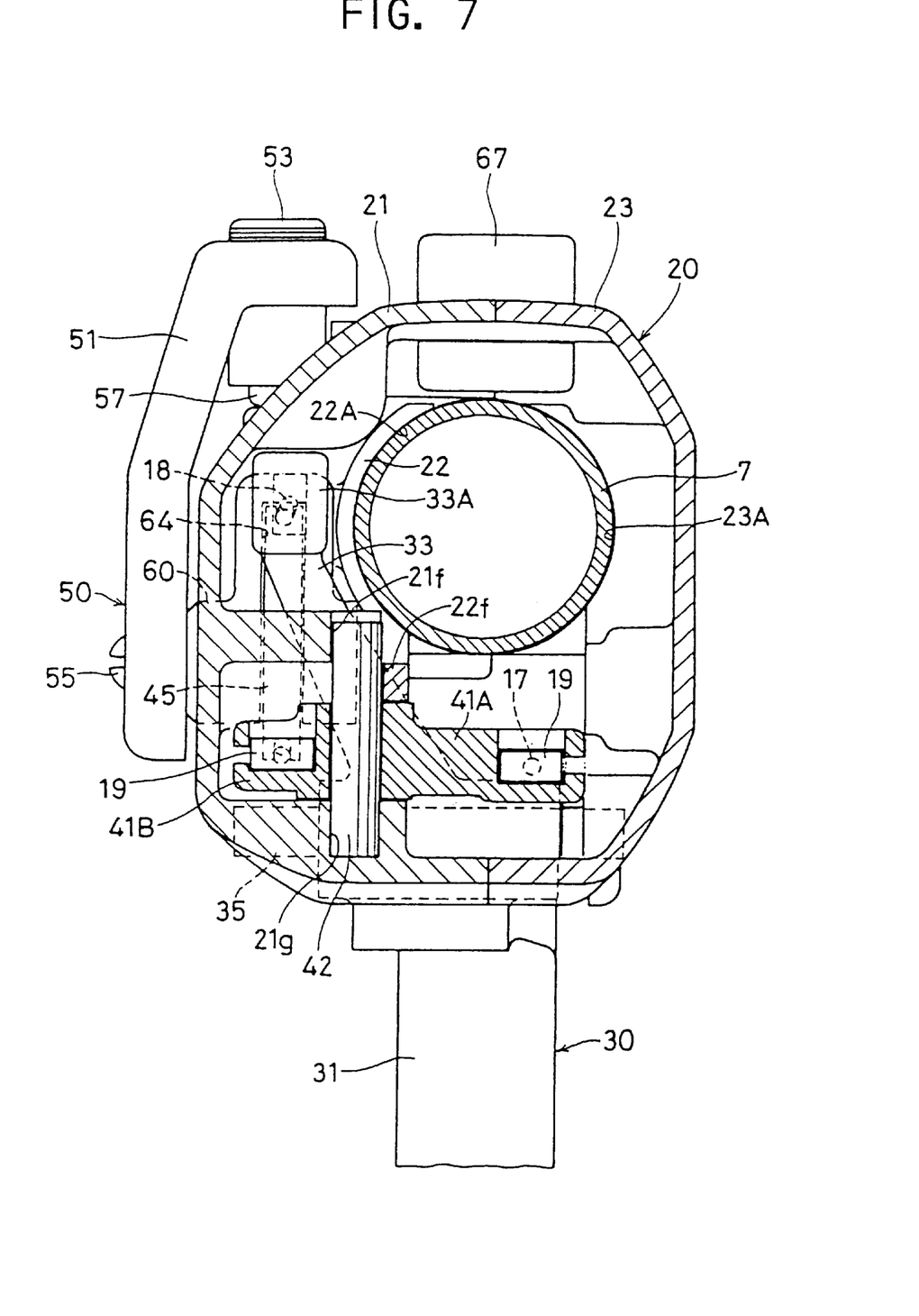
FIG. 7 is a sectional view taken on line VII—VII of FIG. 5.

As best seen in FIGS. 6 and 7, the case member 20 has a structure which consists of three components made of synthetic resin, namely, a right side cover case 21, an intermediate cover case 22, and a left side cover case 23.

Figure 10:
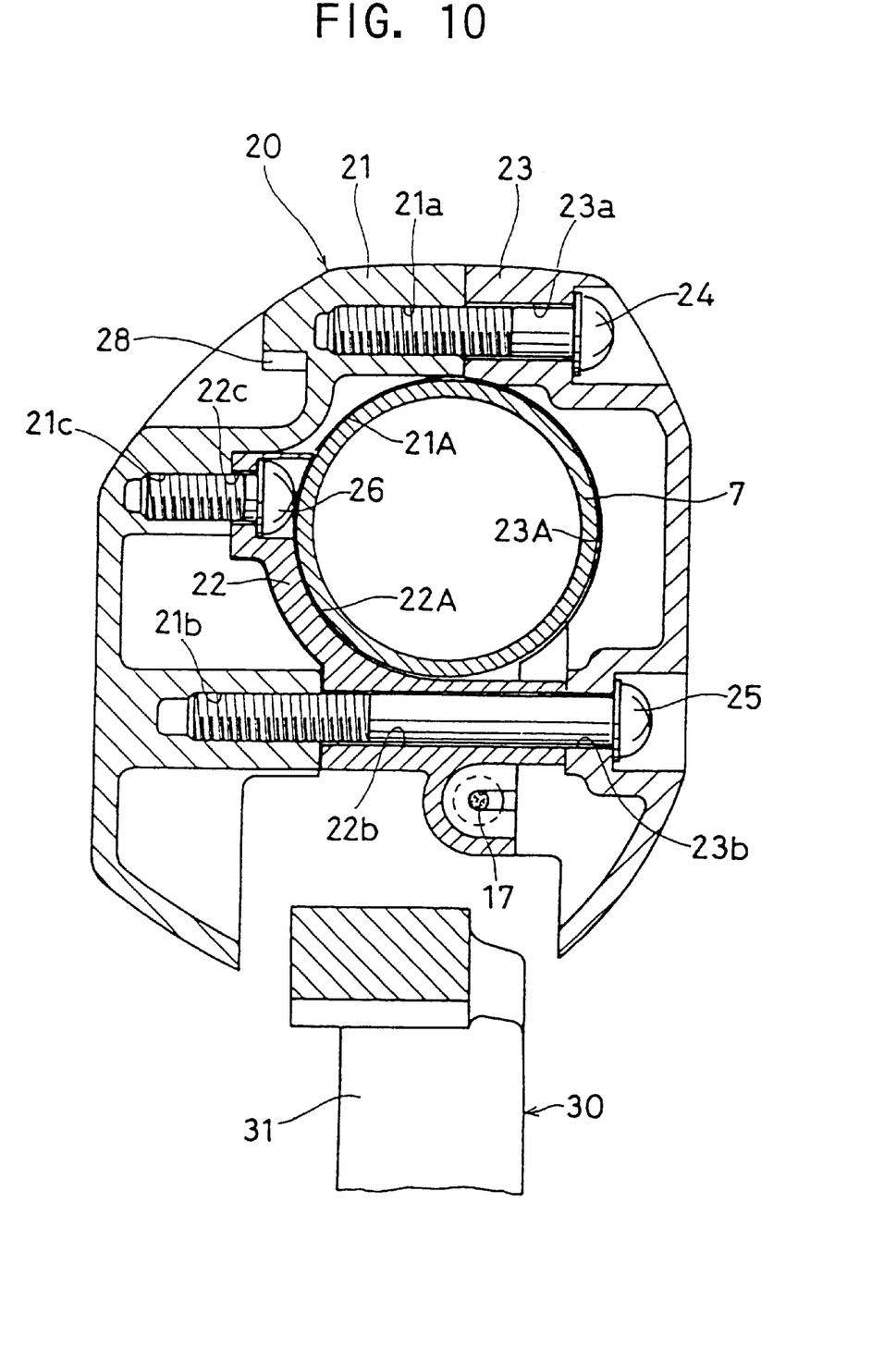
FIG. 10 is an enlarged sectional view taken on line X—X of FIG. 2.

The right side cover case 21 and the left side cover case 23 has a substantially rectangular plate-like external shape. As best seen in FIG. 2 and FIG. 10 showing a sectional view taken along a line X—X in FIG. 2, it has threaded holes 21a, 21b and insertion holes 23a, 23b arranged at four locations in an upper and a lower rows, respectively. Screws 24 are inserted into the respective insertion holes 23a and threadably engaged with the threaded holes 21a in the upper row and screws 25 are inserted into the respective insertion holes 23b and the threaded holes 21b, 21b similarly arranged in the lower row.

This structure allows the right side cover case 21 and the left side cover case 23 to be fixed to each other with the intermediate cover case 22 interposed therebetween by engaging the semicircular-sectional contact surfaces 21A, 22A, 23A provided to the respective cover cases (21, 22, 23) at front and rear end portions thereof, with the outer surfaces of the handle 7 so as to intervene the handle 7 therebetween.

Figure 5:
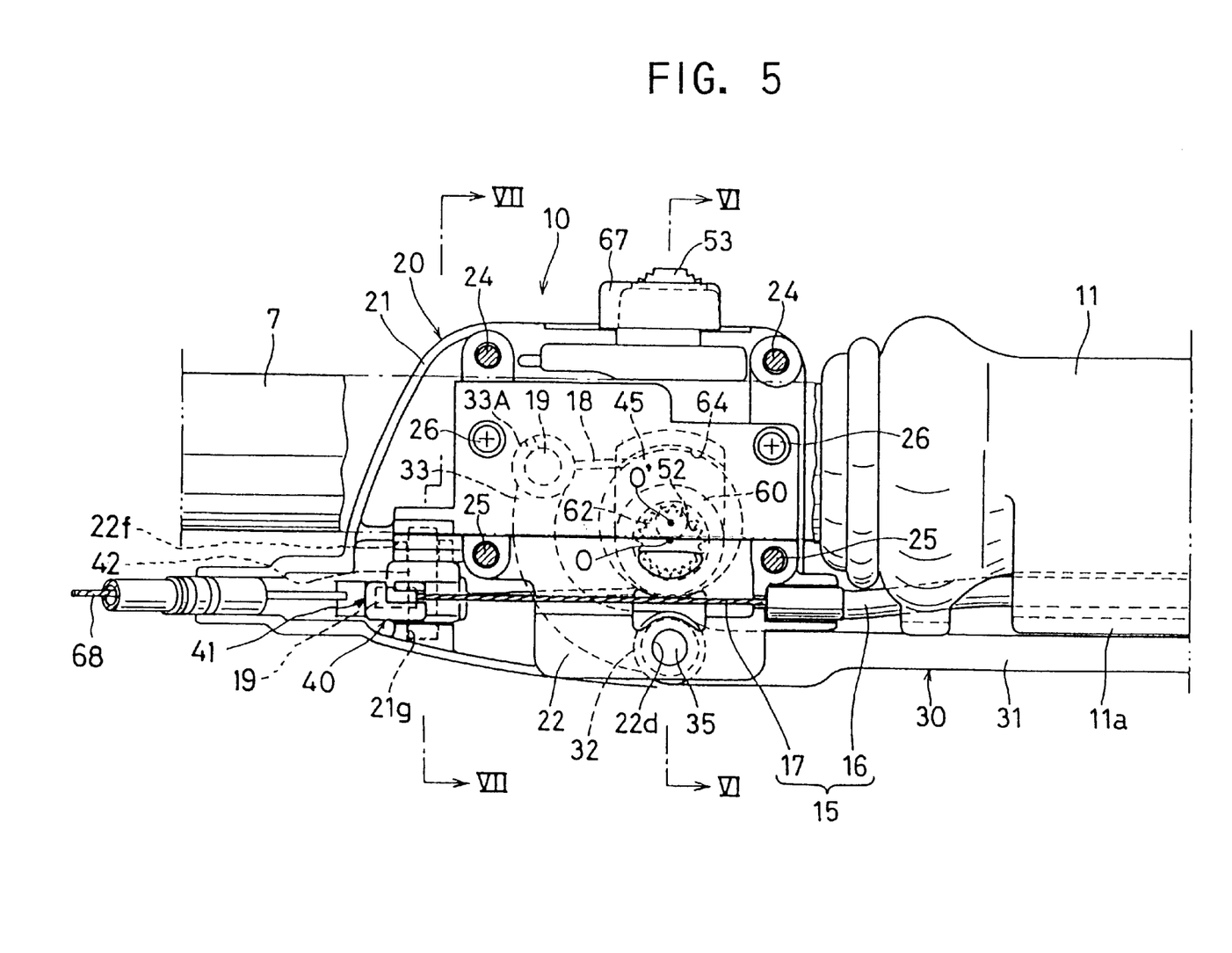
FIG. 5 is an enlarged left side view of the hand-lever device for the trimmer of FIG. 2, with its left side cover case removed.
Figure 9:
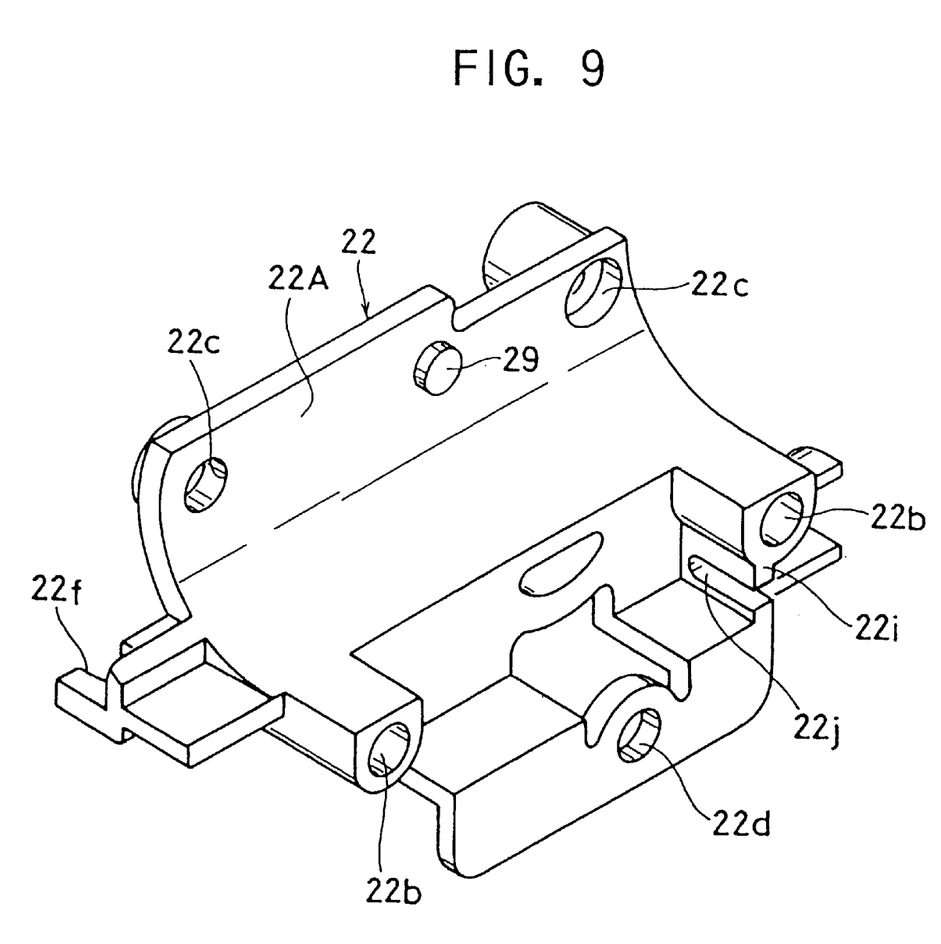
FIG. 9 is a perspective view of an intermediate cover case of the hand-lever device for the trimmer of FIG. 2.

As best seen in FIG. 10 and FIG. 5 showing a view with the left side cover case 23 removed therefrom and FIG. 9 showing a single component, the intermediate cover case 22 interposed between the right side cover case 21 and the left side cover case 23 is formed with insertion holes 22b into which the screws 25 are inserted between the threaded holes 21b arranged in the lower row and the insertion holes 23b. It also has a semicircular-shaped sectional contact surface 22A to be brought into contact with the lower part of the outer right surface of the handle 7 and insertion holes 22c with which screws 26 are to be threadably engaged are formed in the vicinity of both front and rear ends of the upper part of the contact surface 22A, said screws 26 being threadably engaged with threaded holes 21c which are provided near the front and rear ends of the middle part of the right side cover case 21. The intermediate cover case 22 is fastened to the right side cover case 21 by the screws 26.

The contact surface 22A of the intermediate cover case 22 has a projected portion 29 for preventing the rotation of the intermediate cover case 22, which can be fitted into a round recessed portion 9 which is provided near the middle part of the right outer surface of the cylindrical handle 7 but does not penetrate in the direction of thickness.

As can be seen with reference to FIGS. 5 to 8, the main lever 30 rotatably attached to the case member 20 comprises a straight operational portion 31 rotated by hand toward a lever receiving portion 11a provided to a lower part of the rear grip portion 11, a cylindrical portion 32 rotatably supported by a support shaft 35, and a curved portion 33 which is bent so as to slightly twist obliquely and upwardly and to the right and whose base end integrally coupled to the cylindrical portion 32. The right end portion of the support shaft 35 is press-fitted into an insertion hole 21d formed near the corner of the rear lower part of the right side cover case 21 and the left end portion of the support shaft 35 is press-fitted into an insertion hole 22d formed in the intermediate cover case 22 and further loosely inserted into an insertion hole 23d formed in the left side cover case 23.

The throttle cable 17 is operatively pulled by the main lever 30 having the above-mentioned constitution via an operation (pulling) stroke amplifying mechanism 40 and a pulley or a direction changing member 45.

Figure 8:
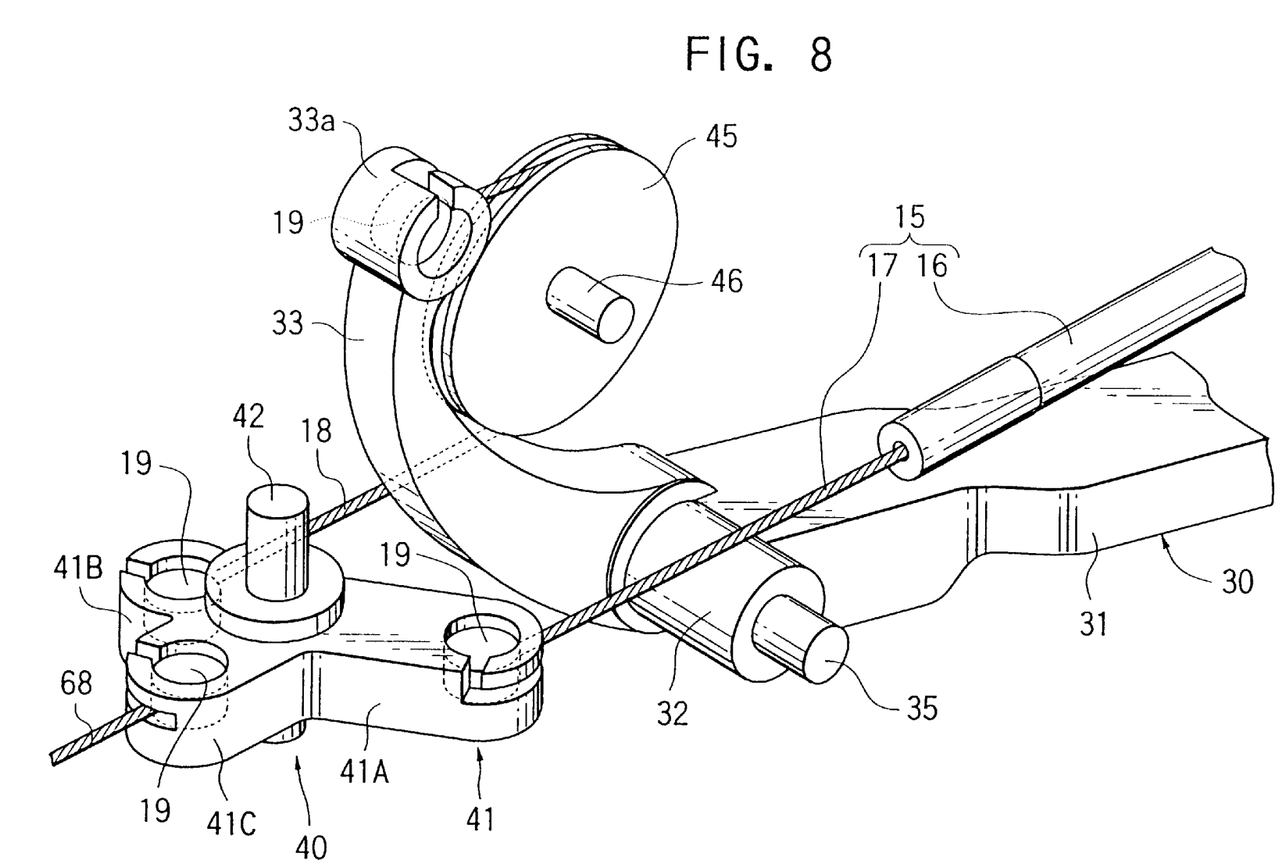
FIG. 8 is a schematic perspective view of an operation (pulling) stroke amplifying mechanism and its related portion of the hand-lever device for the trimmer of FIG. 2.

As best seen in FIGS. 7 and 8, the operation stroke amplifying mechanism 40 includes a lever 41 rotatably supported by a support shaft 42 whose both ends are supported by a bearing hole 21g provided to the lower part of the front end of the right side cover case 21, a shaft support part 21f provided to the middle part of the right side cover case 21 and a shaft support part 22f provided to the intermediate cover case 22, and an end fitting 19 attached to the front end of the throttle cable 17 is inserted into the front end (left end) of a longer arm 41A of the lever 41 so as be retained thereto. On the side of a shorter arm 41B of the lever 41 and on the front side thereof, a wire attaching portion 41C is protruded for inserting and retaining an end fitting 19 which is connected to the wire 68 at one end.

The front end of an outer tube 16 of a Bowden cable 15 with the throttle cable 17 inserted therein is retained by a retaining part 22i (FIG. 9) provided to the intermediate cover case 22 and is pulled out of a slit 22j provided to the front part of the retaining part 22i to the side of the longer arm 41A of the lever 41 and connected to the longer arm 41A.

End metal fittings 19 attached to both ends of a cable 18 which is wound around a pulley 45, i.e., a direction changing member, so as to reverse its direction are inserted into and retained to the front end portion (the right end portion) of the shorter arm 41B of the lever 41 and a front end cylindrical portion 33a of the curved portion 33 of the main lever 30, respectively.

In such constitution, as best seen in FIG. 8, when (the operational portion 31 of the main lever 30 is rotated in the direction toward the rear grip portion 11, the shorter arm 41B and the wire attaching portion 41C of the lever 41 are pulled backwardly via the cable 18 so as to rotate the lever 41 in a clockwise direction in the plan view. It causes the throttle cable 17 to be pulled out in a forward direction by the longer arm 41A of the lever 41 and the stroke of the pulled throttle cable 17 is amplified by a lever ratio of the lever 41. Further, the wire 68 is pulled out in a backward direction and the cutter braking device 8 is moved from an operating position to a non-operating position against the biasing force.

The present embodiment is further provided with a position adjusting mechanism 50 to force to move the pulley 45 in the direction of pulling the throttle cable 17 and to hold the pulley 45 unmoved at an arbitrary position.

As best seen in FIGS. 4 to 7, the position adjusting mechanism 50 comprises a rotatable shaft 60 having a housing portion 64 to house the pulley 45, a sub-lever 51 provided with a serration 52 to fit into a serrated shaft portion 62 provided to a right end part of the rotatable shaft 60 and fixed by a screw 55 to a right end part of the rotatable shaft 60. The rotatable shaft 60 is supported at its left end and right end by a bearing portion 22e provided to a right side part of the intermediate cover case 22 and a bearing portion 21e provided to the right side cover case 21, respectively, and the pulley 45 is rotatably supported by a pin 46 inside the housing portion 64. In this embodiment, the center axis O' of the pin 46 supporting the pulley 45 is eccentrically arranged by a predetermined distance E above the rotational axis O (the center axis of the rotatable shaft 60) of the sub-lever 51, and when the sub-lever 51 is rotated backwardly, the pulley 45 is moved in the direction of pulling the throttle cable 17 (a backward direction).

A cylindrical push button 53 with an open bottom is fitted to an upper part of the sub-lever 51 so as to freely slide upwardly and downwardly, and a sleeve 57 having a bottom is fitted into the push button 53 so as to slide backwardly and forwardly. The bottom of the sleeve 57 being normally biased downwardly by a coil spring 56, being protruded downwardly, and being brought into contact with a right shoulder part of the right side cover case 21.

Further, a movable jagged portion 58 with its jag oriented upwardly is provided to the a lower left end part of the push button 53, and a fixed jagged portion 28 which engages with the movable jagged portion 58 and extends downwardly and back and forth along an arc whose center is existing on the rotational axis O of the rotatable shaft 60 is provided to an upper part of the right side cover case 21, as best seen in FIGS. 3 and 4 for reference.

In the position adjusting mechanism 50 as constituted as above, the engagement between the movable jagged portion 58 and the fixed jagged portion 28 is released when the push button 53 is pressed. In this condition, if the push button 53 is moved backwardly to an arbitrary position, the sub-lever 51 swings backwardly, and then the pulley 45 is moved in a direction of pulling the throttle cable 17 (a backward direction), and in this condition, if the pressure on the push button 53 is removed, the movable jagged portion 58 and the fixed jagged portion 28 engage with each other again and the sub-lever 51 and the pulley 45 are held to the arbitrarily selected operational position at this moment.

A slide type engine stop switch 67 for stopping the engine 2 by breaking the current to an ignition plug 5 of the internal combustion engine 2 is interposed between short notches 21k, 23k formed in the middle parts of the upper surfaces of the right side cover case 21 and the left side cover case 23.

Figure 11:
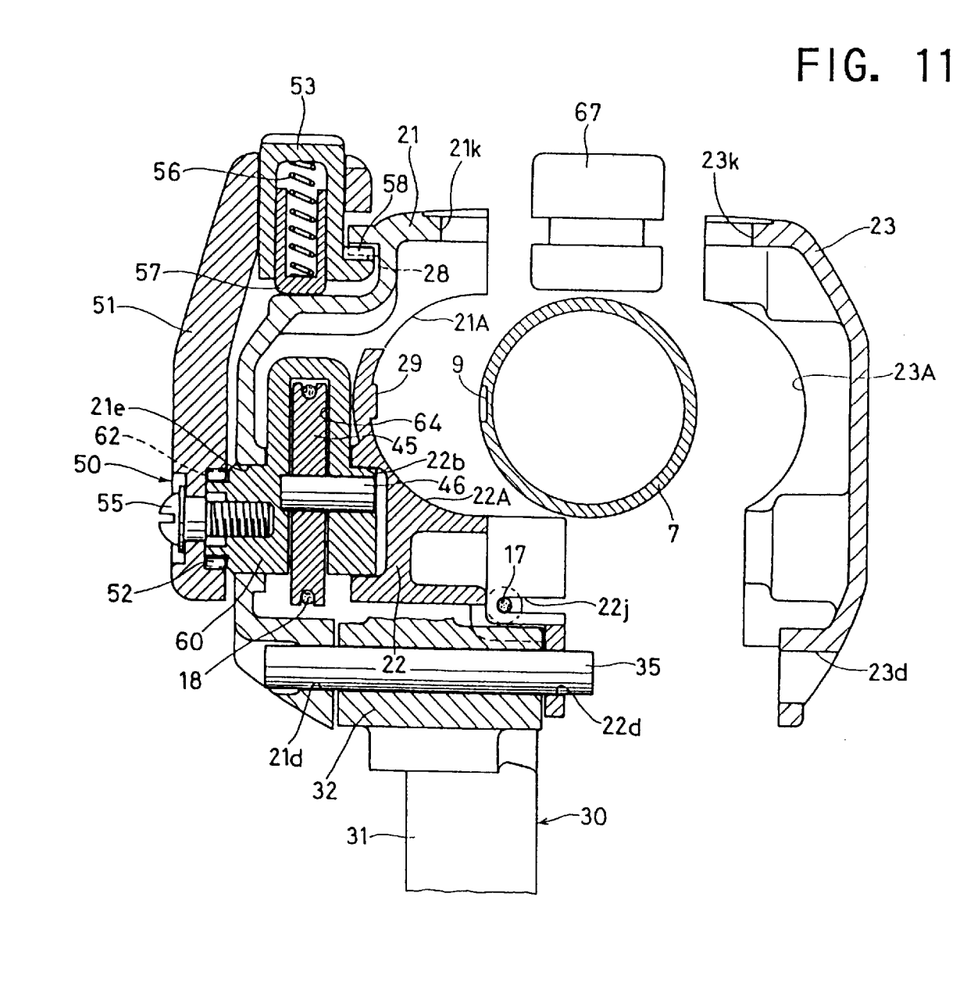
FIG. 11 is a sectional view of the hand-lever device of FIG. 6, with its right side, intermediate, and left side cover cases removed from the handle.

In order to attach the present embodiment of the hand-lever device 10 constituted as stated-above onto the handle 7, the right side cover case 21 and the intermediate cover case 22 are fastened together to accommodate movable mechanism members such as the main lever 30, the pulling stroke amplifying mechanism 40, the pulley 45, the position adjusting mechanism 50, or the like. and the intermediate cover case 22 is fastened to the right side cover case 21 by two screws 26 (refer to FIGS. 5, 10, 11).

Then, a partially-assembled body comprising the right side cover case 21 and the intermediate cover case 22 which accommodate and hold the movable mechanism members such as the main lever 30, the pulling stroke amplifying mechanism 40, the pulley 45, the position adjusting mechanism 50, or the like. and the left side cover case 23 are fastened together so as to hold the handle 7 therebetween. At this time, the projected portion 29 provided to the intermediate cover case 22 is precisely located with respect to and inserted into the recessed portion 9 provided to the handle 7 and then the right side cover case 21 and the intermediate cover case 22 are fastened to the left side cover case 23 by four bolts 24, 25.

The cases composing the case member 20, i.e., the right side cover case 21, the intermediate cover case 22 and the left side cover case 23 are fittingly fixed to a predetermined position outside the handle 7.

In the present embodiment of a hand-lever device 10 fastened to the handle 7, the case member 20 is released from the handle 7 by removing the left side cover case 23 from the right side cover case 21 to which the intermediate cover case 22 is fastened.

When the case member 20 is removed from the handle 7 and the cases composing the case member 20, i.e., the right side cover case 21, the intermediate cover case 22 and the left side cover case 23 are disassembled and separated, that is, in such cases, before mounting the hand-lever device 10 onto the handle 7 or during inspection and maintenance service of the hand-lever device 10, movable mechanism members such as the main lever 30, the pulling stroke amplifying mechanism 40, the pulley 45, the position adjusting mechanism 50, or the like are held installed by only the right side cover case 21 and the intermediate cover case 22, as shown in FIG. 11.

Therefore, a hand-lever device 10 of the present embodiment facilitates an installation operation of the device onto a handle and inspection and maintenance operations of the device, compared with a conventional hand-lever device whose bisected structure makes it difficult to properly hold the movable mechanism members.

Further, a recessed portion 9 and a projected portion 29 to be inserted into the recessed portion 9 are provided to the handle 7 and the intermediate cover case 22 respectively, and when the case member 20 is fittingly fastened outside the handle 7 with these recessed portion 9 and projected portion 29 being fitted each other, the effect of the fitting between the recessed portion 9 and the projected portion 29 prevents the case member 20 from moving longitudinally as well as from rotating around the handle 7.

The afore-mentioned structure provides constant stable operation of the hand-lever device 10. Further, it prevents dislocation of the front end of the throttle cable 17 and it makes the stroke of the pulled cable 17 to be constant with respect to the operation of the main lever 30 or the position adjusting mechanism 50, which enables to accurately control the opening of the throttle valve CV.

In the hand-lever device 10 of the present embodiment constituted as above, when the main lever 30 is rotated to the set position near the rear grip portion 11 of the handle 7, the throttle cable 17 is pulled by the predetermined length via the pulling stroke amplifying mechanism 40 and the pulley or a direction changing member 45, whereby the play is eliminated.

Since the stroke (displacement) of the cable 17 pulled by the main lever 30 is amplified by the pulling stroke amplifying mechanism 40, the rotational operation angle α (FIG. 2) required to pull the cable 17 through a predetermined distance can be smaller than that required by a conventional hand-lever device. This makes it possible to reduce the rotation space required between the rear grip portion 11 of the handle 7 and the main lever 30. It results in a more compact and lighter device and also improved working conditions and operability.

Then, when the sub-lever 51 is operated to a rear predetermined position by pushing the push button 53 provided to the position adjusting mechanism 50 while the main lever 30 is held at the set position, the pulley 45 is forced to move in a direction to pull the throttle cable 17, and whereby the throttle cable 17 is further pulled via the pulling stroke amplifying mechanism 40 and the pulley 45 to cause the throttle valve CV to move from the minimum opening position (the idle revolution throttle opening position) toward a larger opening position to adjust the opening of the throttle valve CV.

In this case, since the throttle cable 17 is pulled by the pulley 45 while being wound therearound, the stroke of the pulled cable 17 is twice as long as that of the displacement of the pulley 45. This reduces the necessary stroke of the sub-lever 51 of the position adjusting mechanism 50 for adjusting the throttle opening of the throttle valve CV, i.e., the stroke of the pulley 45, and enables to reduce the size and the weight of the device.

It is to be noted that even if the sub-lever 51 is released, it is held at the operational position by the engagement between the movable jagged portion 58 and the fixed jagged portion 28. This reduces the loading applied to the hand and fingers.

If one wishes to immediately decelerate the rotational speed of the engine 2 in the event of emergency, while the opening of the throttle valve CV has been adjusted as described above, the main lever 30 is released. This allows the main lever 30 and the lever 41 of the pulling stroke amplifying mechanism 40 to be pulled in the counter-direction with respect to the former direction and to return to the original position because the throttle cable 17 is biased in the direction to close the throttle valve CV, and thereby the throttle cable 17 is returned to the non-operated condition and the throttle valve CV returns to the idle revolution throttle opening position, and thus the engine 2 runs at the idling condition. Further, when the main lever 30 is released, the wire 68 is released and the braking device 8 is returned from the non-operated position to the operated position by the pressing force against the cutter 13, and thereby the wire 68 is also pulled back in a forward direction.

If the working machine 1 is of the type which the rotational driving force from the engine 2 is transmitted through a centrifugal clutch to the working section 3 having a cutter 13, the centrifugal clutch is disengaged to stop power transmission to the working section 3, and whereby the working section 3 having a cutter 13 is immediately stopped.

As described above, when the main lever 30 is operated to the set position near the rear grip portion 11 again after it is released, the play of the throttle cable 17 is eliminated.

The throttle valve CV resumes its former throttle opening position, i.e., the position before the main lever 30 is released, because the sub-lever 51 provided to the position adjusting mechanism 50 (is held at the former operating position. Therefore, the sub-lever 51 no longer need be readjusted.

As described above, the hand-lever device 10 of the present embodiment allows the throttle opening of the throttle valve CV or a driven member to be adjusted through the cable 17, to be easily held at a desired throttle opening position, and to be immediately returned to the minimum throttle opening position (the idle revolution throttle opening position) and thereby safety is assured and the fatigue of the hand and fingers are reduced. It further eliminates the readjustment which is required for setting the throttle valve CV to its former throttle opening position, i.e., the position before it is returned to the idle revolution throttle opening position. It enables to provide a smaller and lighter device and also improved working condition and operability.

Though an embodiment of the present invention has been detailed as above, the present invention shall not be limited to the one described above and various changes and modifications in design may be made without departing from the spirit and scope of the invention as described in the claims.

Figure 12:
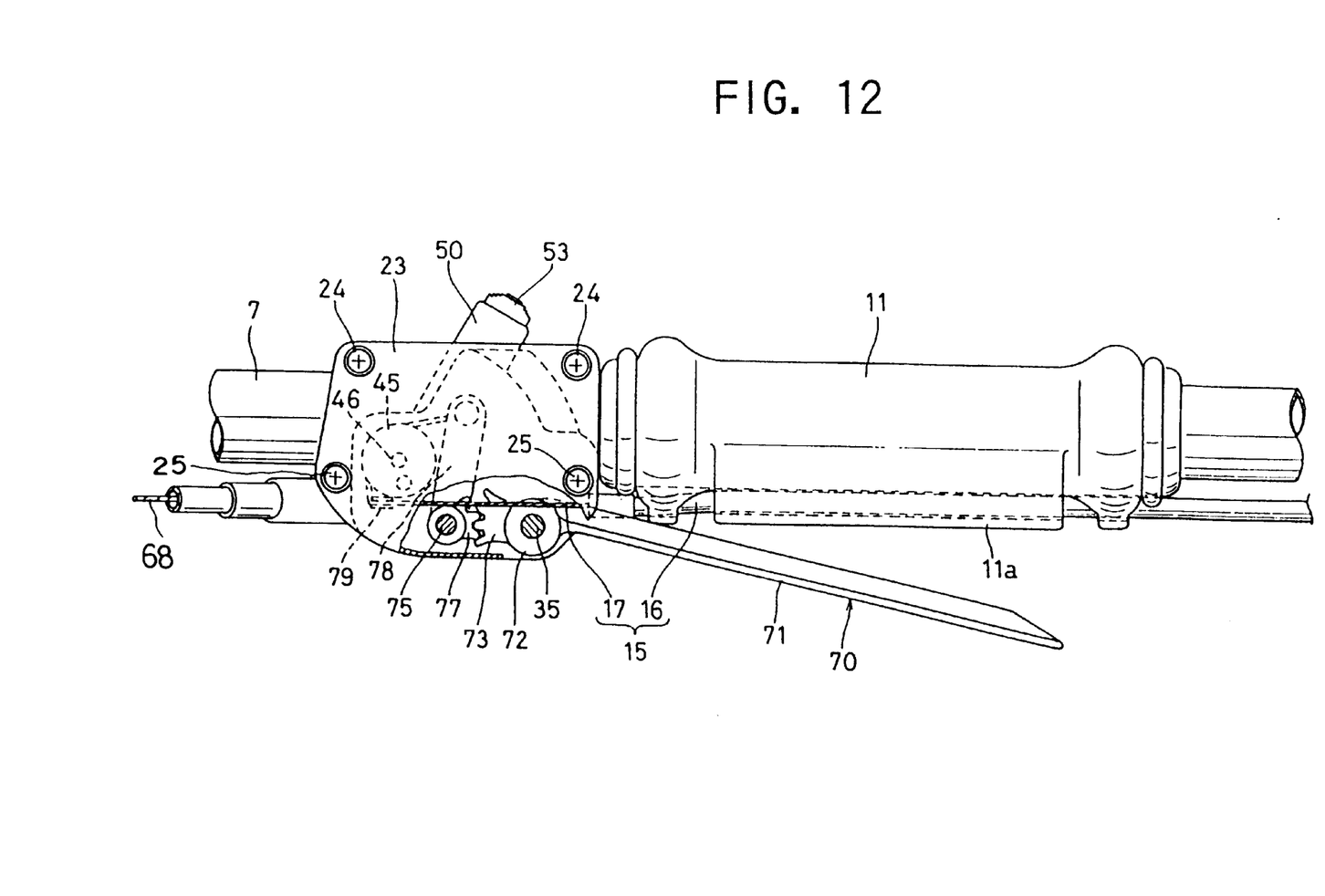
FIG. 12 is a partial broken left side view of another embodiment of a hand-lever device for a trimmer according to the present invention.

For example, in the present embodiment, the operation stroke amplifying mechanism of FIG. 12 is constituted to employ, instead of the lever 41 as shown in FIG. 8, it may be may be constituted in such a way that a first large diameter sector-shaped gear 73 is provided to a cylindrical part 72 of a main lever 70, the main lever 70 having an operating portion 71 and the cylindrical part 72 rotatably supported by a support shaft 35, a second small diameter sector-shaped gear 77 supported by a support shaft 75 is arranged so as to engage with the first sector-shaped gear 73, a pulling lever 78 is integrally coupled to the second sector-shaped gear 77, and the front end of a throttle cable 17 is connected to the front end of the pulling lever 78, and thereby the throttle cable 17 is pulled through a guide member 79 and a pulley 45 by the pulling lever 78, and in this embodiment, the sector-shaped gears 73, 77 and the pulling lever 78 implement the function of the main lever 70 to amplify the stroke of the pulled cable 17.

Though the hand-lever device 10 is used to adjust the throttle opening of the throttle valve CV of the internal combustion engine 2, the hand-lever device of the present invention can be utilized for other purpose other than the adjustment of throttle opening of the throttle valve CV.

Further the hand-lever device 10 itself may be attached to a U-shaped handle other than the bar handle 7.

What is claimed is:

1. A hand-lever device for a hand held trimmer, said hand-lever device comprising:
   a) a driven member;
   b) a cable coupled to said driven member;
   c) a rotatably-operated main lever for manipulating said cable;
   d) an operation stroke amplifying mechanism interconnected between said main lever and said cable;
   e) a cutter braking device;
   f) a wire for controlling said cutter braking device; and
   g) said operation stroke amplifying mechanism having a wire attaching portion for receiving said wire and for amplifying the movement of said cable and said wire upon movement of said main lever for controlling said driven member and said cutter braking device.

2. A hand-lever device for a trimmer in accordance with claim 1, wherein said driven member is a throttle valve of an internal combustion engine.

3. A hand-lever device for a trimmer in accordance with claim 1, wherein said operation stroke amplifying mechanism has a lever and said lever is provided with said wire attaching portion.

4. A hand-lever device for a trimmer in accordance with claim 1, wherein said operation stroke amplifying mechanism has a gear system.

5. A hand-lever device for a trimmer in accordance with claim 4, wherein said position adjusting mechanism is provided with a sub-lever and said direction changing member is attached away from a rotating axis of said sub-lever.

6. A hand-lever device for a trimmer in accordance with claim 5, wherein said sub-lever can be held unmoved at an arbitrary operational position.

7. A hand-lever device for a hand held trimmer, said hand-lever device comprising:
   a) a driven member;
   b) a cable coupled to said driven member;
   c) a direction changing member for said cable;
   d) a rotatably-operated main lever for manipulating said cable via said direction changing member;
   e) an operation stroke amplifying mechanism interconnected between said main lever and said cable;
   f) a cutter braking device;
   g) a wire for controlling said cutter braking device; and
   h) said operation stroke amplifying mechanism including a wire attaching portion for receiving said wire and a position adjusting mechanism for moving said direction changing member and holding said direction changing member at an arbitrary position for amplifying the controlled movement of said cable and said wire upon movement of said main lever for controlling said driven member and said cutter braking device.

8. A hand-lever device for a trimmer in accordance with claim 2, wherein said position adjusting mechanism is provided with a sub-lever and said direction changing member is attached away from a rotating axis of said sub-lever.

9. A hand-lever device for a trimmer in accordance with claim 8, wherein said sub-lever can be held unmoved at an arbitrary operational position.

10. A hand-lever device for a trimmer in accordance with claim 7, wherein said direction changing member is a pulley.

11. A hand-lever device for a trimmer in accordance with claim 7, wherein said driven member is a throttle valve of an internal combustion engine.

12. A hand-lever device for a trimmer in accordance with claim 2, wherein said position adjusting mechanism is provided with a sub-lever and said direction changing member is attached away from a rotating axis of said sub-lever.

13. A hand-lever device for a trimmer in accordance with claim 12, wherein said sub-lever can be held unmoved at an arbitrary operational position.

14. A hand-lever device for a trimmer in accordance with claim 13, wherein said direction changing member is a pulley.

15. A hand-lever device for a trimmer in accordance with claim 12, wherein said direction changing member is a pulley.

16. A hand-lever device for a trimmer, comprising:
   a driven member;
   a cable coupled to said driven member,
   a rotatably-operated main lever for manipulating said cable, an operation stroke amplifying mechanism provided between said main lever and said cable, a cutter braking device, a wire for controlling said cutter braking device, and said operation stroke amplifying mechanism having a wire attaching portion for attaching said wire, said operation stroke amplifying mechanism having a lever and said lever being provided with said wire attaching portion, said operation stroke amplifying mechanism being provided with a sub-lever and a direction changing member being attached away from a rotating axis of said sub-lever for amplifying the movement of said cable and said wire by said operation stroke amplifying mechanism upon movement of said main lever for controlling said driven member and said cutter braking device.

17. A hand-lever device for a trimmer in accordance with claim 16, wherein said operation stroke amplifying mechanism has a gear system.

18. A hand-lever device for a trimmer in accordance with claim 16, wherein said sub-lever can be held unmoved at an arbitrary operational position.

19. A hand-lever device for a trimmer in accordance with claim 16, wherein said driven member is a throttle valve of an internal combustion engine.

20. A hand-lever device for a trimmer, comprising:

a driven member, a cable coupled to said driven member, a direction changing member for said cable, a rotatably-operated main lever for manipulating said cable via said direction changing member, an operation stroke amplifying mechanism provided between said main lever and said cable, a cutter braking device, a wire for controlling said cutter braking device, and said operation stroke amplifying mechanism being provided with a wire attaching portion for attaching said wire and a position adjusting mechanism for moving said direction changing member and holding said direction changing member at an arbitrary position, said position adjusting mechanism being provided with a sub-lever and said direction changing member being attached away from a rotating axis of said sub-lever the movement of said cable and said wire by said operation stroke amplifying mechanism upon movement of said main lever for controlling said driven member and said cutter braking device.

21. A hand-lever device for a trimmer in accordance with claim 20, wherein said sub-lever can be held unmoved at an arbitrary operational position.

22. A hand-lever device for a trimmer in accordance with claim 20, wherein said direction changing member is a pulley.

23. A hand-lever device for a trimmer in accordance with claim 20, wherein said driven member is a throttle valve of an internal combustion engine.

* * * * *